(12) United States Patent
Carbajal (10) Patent No.: US 9,109,892 B2
(45) Date of Patent: Aug. 18, 2015

(54) LIGHT-ENABLED PLUMB INDICATOR AND WALL BRACE DEVICE

(76) Inventor: Eduardo Carbajal, Santa Cruz, CA (US)

( * ) Notice: Subject to any disclaimer, the term of this patent is extended or adjusted under 35 U.S.C. 154(b) by 543 days.

(21) Appl. No.: 13/529,939

(22) Filed: Jun. 21, 2012

(65) Prior Publication Data

US 2013/0340267 A1 Dec. 26, 2013

(51) Int. Cl.
| | |
|---|---|
| *G01C 15/10* | (2006.01) |
| *G01C 9/06* | (2006.01) |
| *G01C 15/00* | (2006.01) |
| *G01C 15/12* | (2006.01) |

(52) U.S. Cl.
CPC ........ *G01C 15/10* (2013.01); *G01C 9/06* (2013.01); *G01C 15/002* (2013.01); *G01C 15/004* (2013.01); *G01C 15/008* (2013.01); *G01C 15/12* (2013.01)

(58) Field of Classification Search
CPC ...... G01C 9/06; G01C 15/004; G01C 15/008; G01C 15/002; G01C 15/12; G01C 15/10
USPC .................................. 33/283, 286; 52/127.2
See application file for complete search history.

(56) References Cited

U.S. PATENT DOCUMENTS

| | | | | |
|---|---|---|---|---|
| 1,003,499 A | * | 9/1911 | Platt ................................ 33/392 |
| 3,574,981 A | * | 4/1971 | Henschen ..................... 52/127.2 |
| 4,068,427 A | * | 1/1978 | Camardo ...................... 52/127.2 |
| 5,201,129 A | * | 4/1993 | Ukawa ............................ 33/391 |
| 5,481,809 A | * | 1/1996 | Rooney ............................ 33/392 |
| 5,956,906 A | * | 9/1999 | Berich et al. ..................... 52/149 |
| 6,065,254 A | * | 5/2000 | Lanka ........................... 52/127.2 |
| 6,247,273 B1 | * | 6/2001 | Nickel .......................... 52/127.2 |
| 6,539,640 B1 | * | 4/2003 | Brown ............................ 33/393 |
| 6,550,188 B2 | * | 4/2003 | Bolinger et al. ............. 52/127.2 |
| 6,594,910 B2 | * | 7/2003 | Wishart .......................... 33/286 |
| 6,742,269 B2 | * | 6/2004 | Kim et al. ....................... 33/283 |
| 6,763,595 B1 | * | 7/2004 | Hersey ........................... 33/286 |
| 7,055,256 B2 | * | 6/2006 | Alecci .............................. 33/392 |
| 7,174,647 B2 | * | 2/2007 | Krantz et al. ................... 33/286 |
| 7,269,907 B2 | * | 9/2007 | Levine et al. ................... 33/286 |
| 7,287,336 B1 | * | 10/2007 | Goodrich ........................ 33/286 |
| 8,287,221 B1 | * | 10/2012 | Van Roekel .................... 414/11 |
| 8,595,947 B2 | * | 12/2013 | Cade ............................... 33/392 |
| 2005/0072059 A1 | * | 4/2005 | Hodsdon et al. ................. 52/64 |
| 2005/0098769 A1 | * | 5/2005 | Raycraft ........................ 254/329 |
| 2006/0179728 A1 | * | 8/2006 | Lang ............................ 52/127.2 |
| 2007/0175174 A1 | * | 8/2007 | Bruno ......................... 52/745.12 |

\* cited by examiner

*Primary Examiner* — R. A. Smith
*Assistant Examiner* — Tania Courson
(74) *Attorney, Agent, or Firm* — Donn K. Harms (57) ABSTRACT

A device for positioning an object such as a framed wall plumb or perpendicular relative to a support surface therefor. The device features first and second elongated members which are rotationally engaged. With a first end of the second elongated member engaged to the vertically disposed object, and the distal end of the first elongated member positioned upon the support surface, a tilting of the wall is accomplished by pressure applied to a handle portion of the second elongated member. The tilting causes movement of a projected light beam from a position at the first end of the second elongated member. Continued tilting allows a user to align an illumination point of the light beam, with a mark on the support surface, and ascertain the object is plumb relative to the support surface.

8 Claims, 5 Drawing Sheets

LIGHT-ENABLED PLUMB INDICATOR AND WALL BRACE DEVICE

BACKGROUND OF THE INVENTION

1. Field of the Invention

The present invention relates to framing construction employed on conventionally wood-framed buildings. More particularly, it relates to a light enabled plumb indicator for final positioning of walls and vertical structures which concurrently provides a levering function to brace and maintain the framed component structure vertically while allowing for a visual determination of an exact vertical disposition of the framed component for a subsequent final installation.

2. Prior Art

In the construction industry, wood framing of walls for building is a conventionally widely employed mode of construction. Essentially, framed walls are formed remotely or on-site, of wood framing which is later covered with a finished surface such as SHEETROCK or stucco. Such construction provides an exceptionally strong building skeleton to the building having exterior and interior wall surfaces covering the underlying wall frames.

In such contraction, whether the framed wall components are formed on-site, or off-site and shipped for subsequent employment in the building, the heavy wood framing must be tilted vertical and installed on an underlying supporting surface. In the process, the framed wood components are conventionally lifted from a stored horizontal position, to a vertical upright position, by a group of construction workers. Thereafter, prior to being nailed or screwed into place on the support surface, the wall frame component must be situated substantially perpendicular with the underlying support surface. It should be noted that the term wall frame as used herein is for ease of description and should not be limiting. The term should be understood to include any wall or frame or pole or post other structure, that must be plumbed during final installation and is not limited to wall frames alone.

This elevation and plumbing stage of the framed wall components is highly labor intensive. This is because a group of workers is required to lift the wall and to subsequently stand around and wait, while another worker employs a straight edge with a bubble level, to position the wood frame in position perpendicular to the ground. Thereafter, the frame is nailed or screwed to hold the positioning and the group of workers will move to the next framed wall or component.

As can be surmised, such a system requiring a group of workers to aid one worker in lifting and aligning a wood framed wall or support structure, is excessively labor intensive. This is due to the nature of the weight of the framed wall or support structure and the conventional means to plumb such wood framed structures. A worker determining a plumb or vertical line conventionally employs alignment devices such as bubble levels or plumb-bobs, which is a weight, usually with a pointed tip on the bottom, that is suspended from a string and used as a vertical reference line.

As noted, during framed wall construction and installation, while one or a group of workers erect the wall frame, the another worker employs the alignment device on the frame dictating to the other when exact vertical has been reached. The employment of such antiquated construction practices dictated by the state of the art of plumb devices and the conventional heavy weight of framed walls or support structures, dictates the excessive labor conventionally required and the resulting excessive construction costs incurred by builders.

In some applications, linear aligned light, such as that from lasers, can be projected from the frame or support structure, to determine plumb, level, as well as squaring for as-built structures as well as during wall construction. Such employment of laser light is seen in prior art U.S. Pat. No. 6,742,269 to Kim et al., U.S. Pat. No. 6,763,595 to Hersey, and U.S. Pat. No. 7,174,647 to Krantz et al.

However, these as well as other alignment devices in prior art, are simply conventionally enabled bubble devices which still require two or more workers for the dual tasks of both erecting the structure, and the employment of the chosen alignment device to ascertain if the structure erected is plumb. With the high number of walls and support structures employed on construction sites, using excess workers for each wall structure is time consuming and extremely costly.

As such, there is a continuing and unmet need for a plumb and squaring device which is employable by a single worker, to both elevate a wall frame from a horizontal stored position to its upright as-used position. Such a device should provide the mechanical advantage for a worker to raise a heavy wall from a horizontal to vertical position. Further, such a device should also allow the same single worker to plumb the wall during raising properly by the provision of a visually observable means for confirming a plumb elevation of the frame, which is observable standing on the support surface, to allow the single worker to both elevate the framed wall while concurrently validating a plumb or vertical line has been achieved.

Additionally, such a device should be lightweight and easy to use and have a cost low enough to allow multiple devices to be employed on a work site so that they may be employed as a means to hold the elevated framed walls in the plumb as-used position, and allow for subsequent plumb confirmations until fasteners are engaged to hold it in such position.

SUMMARY OF THE INVENTION

The device herein disclosed and described provides a means to achieve the above noted goals through the provision of a wall frame bracing arm with adapted light enabled plumb-bob. The device takes the job of two or more workers by both providing the mechanical advantage to raise a framed wall and a means to support the wall frame typically constructed of two by fours. During the elevation or raising of the framed wall, the device provides a means for making adjustments to be made to the tilt angle of the wall until exact vertical is achieved as validated by a light based confirmation projection visible on the support surface supporting the worker.

In use to plumb a raised wall, one end of the device is placed in an operative communication to the top of the erected wall frame. The other end is positioned on the support surface or floor thereby providing a means to brace and support the wall frame vertically. The top end of the device employs a rotatably engaged light emitter such as a laser which engaged such that when weighted the emitted light communicates vertically downward to a projected light on the support surface. The tilt of the wall frame can then be adjusted by the user using the device, until the projected light hitting the support surface communicates directly at an indication marking made or positioned on the support surface near the base of the frame. When the marking and projected light communicated, it indicates that an exact vertical or perpendicular positioning of the wall has been achieved. The device can be left bracing the wall frame until a more permanent support can be applied, allowing the user to move on to plumb another wall.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

It is an object of the invention to provide a support arm and adaptively engaged laser or light projection indicator for erecting an exact vertical wall frame.

It is another object of the invention that the device be employed by a single user, saving both time and money.

It is a further object of the invention that the device be lightweight and easy to use as well as provide the strength needed to support various wall frames.

Yet another object of the invention is to provide adjustability for employment on a plurality of wall frame heights.

DETAILED DESCRIPTION OF THE PREFERRED EMBODIMENTS OF THE INVENTION

Figure 1:
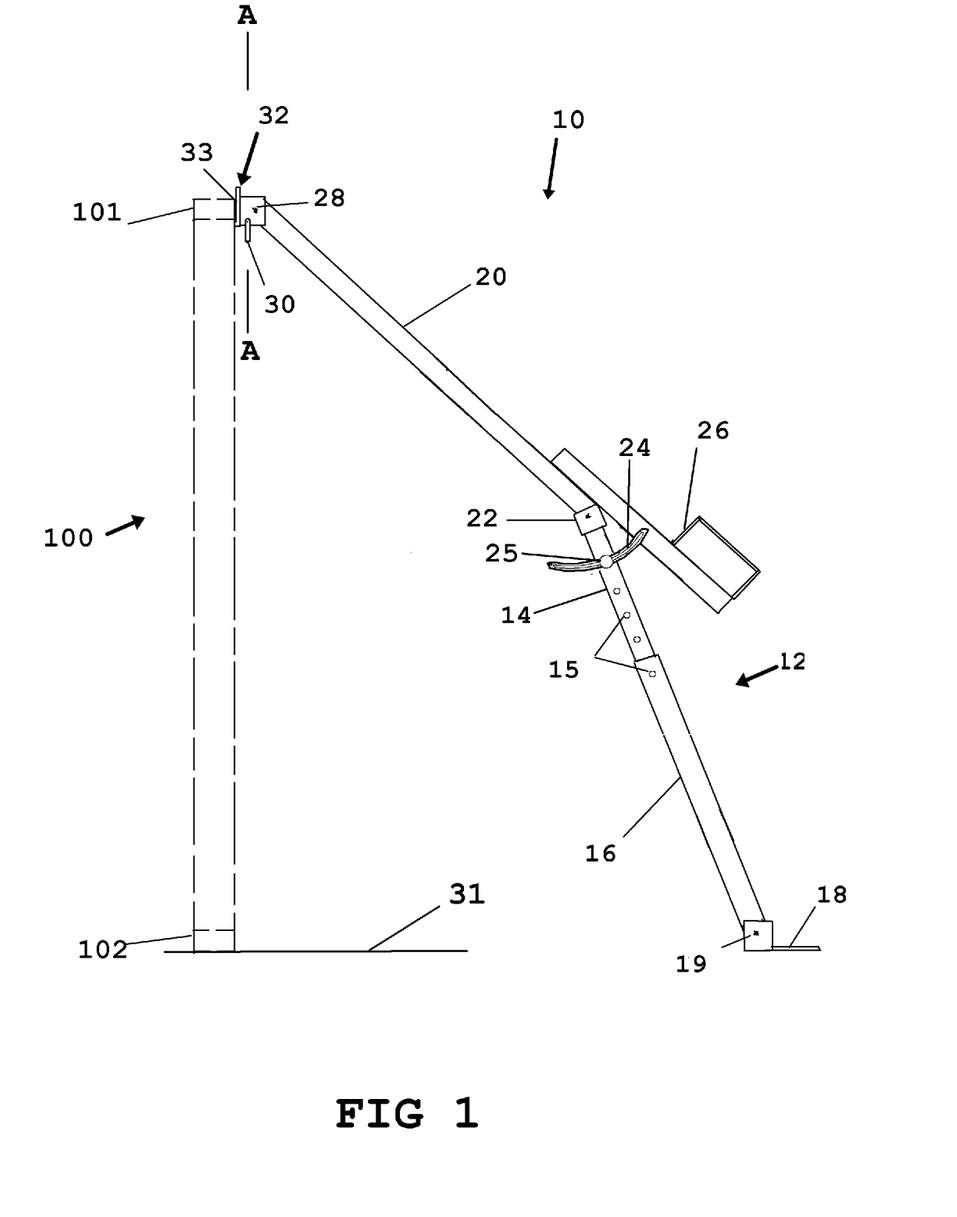
FIG. 1 shows a side view of the device in the as-used position operatively engaged with a wall frame.

Referring now to drawings in FIGS. 1-5, wherein similar components are identified by like reference numerals, there is seen in FIG. 1 a side view of the device 10 engaged to a vertically positionable component which conventionally must be raised and then positioned plumb with a support surface 31 before final engagement, of the component to maintain the plumb position. The component can be a member or pole or other component typically requiring plumb positioning to a support surface 31 such as the depicted wall frame 35 conventionally employed in frame style construction of homes and business buildings.

The device 10, shown in FIG. 1 in an as-used position, is engaged to a side surface of an object such as a wall frame 35 at the first end 32 of a second arm component 20. The first end 32 is in a supported communication with an engagement point on a side surface such as that shown as the uppermost beam 101 on the frame or member to be raised and plumbed, such as the depicted wall frame.

A first elongated member forming a first arm component 12 and a second elongated member forming a second arm component 20, are operationally engaged at an engagement point of the proximal end of the first arm component 12 to the second arm component 20, to provide a means to both brace and hold the framed wall 35 in an upright vertical upright position and subsequently allow a single person to both support and adjust or rotate the heavy wall frame 35 to a determined plumb position, as depicted.

First arm component 12 and second arm component 20 are rotatably engaged at the engagement point in a central portion of the second arm component 20 to the proximal end of the first arm component 12, using means for rotational engagement such as using a pivot or hinge 22. The arm components 12 and 20 and other parts engaged thereto are formed of one or a combination of lightweight materials from a group of such materials including aluminum, plastic, resin, reinforced polymeric materials, fiberglass, composites of resins and fibers, or other strong lightweight materials suitable for the components of the device 10, which provide strength for lifting and plumbing the wall or posts or members.

The first arm component 12 is preferably telescopic and therefor variable in length to allow for adjustment. Currently, the first arm component 12 is formed of two telescopically engaged members shown as first segment 14 and second segment 16. While the minimum of two telescopically engaged segments are shown, a larger plurality of segments that are slidably for telescopic translation may also be employed.

Employing the plurality of telescopically engaged segments to adjust length, provides a means to adjust the overall height of the pivot or hinge 22 at the first end of the first arm component 12 from the supporting surface 31. Thus, in use as shown in FIG. 1, the overall height of the assembled device 10, and an engagement point 32 with a member or wall to be plumbed, can be selectively adjusted by coaxially aligning clearance holes 15 within the first segment 14 and second segments 16 and employing means to removably engage them such as inserting a locking pin (not shown).

An adjustment handle 26 portion, may be an extension of or engaged to, the second arm component 20 and forms a second end of the second arm component. The handle 26 portion extends to a second end of the second arm component 20 past a rotational engagement of the first arm component 12 to the second arm component 20 which is provided by a hinge 22 or other pivoting engagement in a central portion of the second arm component 20 between the first and second end thereof.

The handle 26 provides mechanical advantage using the means to rotate the second arm component 20 at its rotational engagement to the first arm component 12 to realign the second arm component 20 while engaged to an elongated object to made plumb such as the depicted wall frame 35. The handle 26 portion may be separate and engaged to the second arm component 20 or may be part thereof in a unitary structure. If engaged it would be held using means for fixed engagement such as screwing or bolting or welding or adhesive, or otherwise attaching it thereto.

A track 24 shown in a curved configuration, is engaged at one end to the handle 26 portion, and is slidably engaged on a releasable mount with the first component 12 of the device although this engagement could be reversed.

A means to fix the track in its translatable engagement to one of the second component 20 or the first component 12 is provided such as a hand screw component 25 which is shown as riding along the track 24. The means to fix the track to the first component 12 in this hand screw component 25 example is by a tightening thereof to compress the track 24 between the hand screw component 25 and the first component 12 to fix the track position and cease translation.

The hand screw component 25 or other means to fix the track 24 to maintain the angle of the first component 12, to the second component 20, may be selectively tightened. Once tightened and preventing track translation, the track 24 provides a means for fixing the relative position and angle of the second arm component 20 relative to the first arm component 12 and the support surface. This fixing of angles and positioning thereby enables the device 10 to support the wall frame 35 prior to, during plumbing, and afterwards until the object being made plumb such as wall frame 35 is operatively fastened to maintain the plumb vertical positioning of the object such as the wall frame 35 to the support surface 31.

Figure 2:
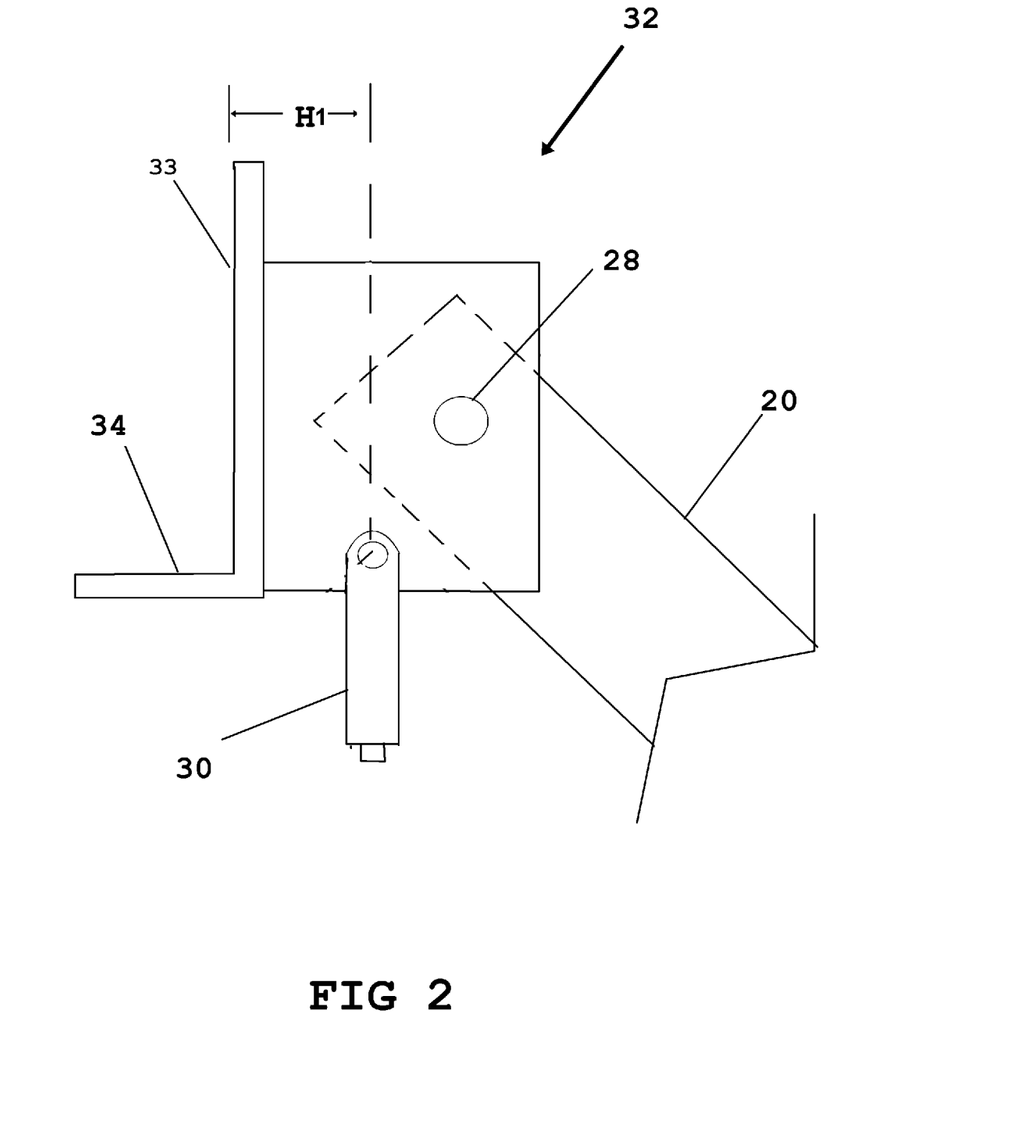
FIG. 2 is a view of the top of the device detailing the means of engagement to a wall frame as well as the laser plumb-bob apparatus.

FIG. 2 shows a view of the first end 32 of the second arm component 20 of the device 10 depicting a means for rotational engagement a surface of the object being made plumb, such as the planar beam 101 of a wall frame 35. Once so removably engaged to the object being made plumb, operation of the device 10 in the as-used position depicted in FIG. 1 is enabled.

Also depicted are the rotationally engaged means for projecting a light beam to an illumination point on the support surface 31 engaged at or adjacent to the first end 32, such as a laser emitting alignment component 30. An engagement component 34 is rotationally engaged to the first end of the second arm component 20 and provides the means for removable engagement of the first end 32 to the object such as wall frame 35 or member or pole or post or other object commonly made plumb during installation. The means for rotational engagement of the first end and alignment component 30, is shown as a pivot or hinge 28.

In an as-used position such as in FIG. 1, the planar 33 surface of the engagement component 34 is removably engaged to allow for a continuous contact to the vertical planar surface 33 of the upper beam 101 of the pre-formed wall frame 35 during both support and plumbing of the wall frame 35. Of course the planar surface 33 could be nailed or screwed or otherwise fastened to the wall, however a non-fastener engagement is preferred and thus the "L" shaped engagement component 34, is the most preferred mode of the device 10 since it requires no fixed engagement or fasteners to temporarily hold the object such as the wall frame 35 plumb, by engagement to an underside surface of the planar surface being contacted. However, other means for removable engagement such as a screw, nail, fastener, or adhesive could easily be employed on the planar surface 33 to hold the engagement component 34 and thus the first end 32 in an operative removable engagement to the object being made plumb, and such are anticipated.

The means for projecting an illumination point from a light beam on the support surface 31 such as an LED or depicted laser component 30 is positioned using means for rotational engagement such as a hinge 28, to an engagement at the second end 32 of the second arm 20. As shown the laser component 30 is attached to the engagement component 32 but could also simply be rotationally engaged to the second end 32. In either engagement, gravity continuously acts upon the rotationally engaged laser component 30 to cause a rotation thereof and maintain the vertical axis of an emitted light beam "L" running along line A-A, which is always substantially perpendicular to the supporting surface 31. A weight can be added to the mount if desired.

So positioned, the emitted light beam "L" runs along axis A-A at a fixed distance H1 from the engagement surface 33 at the point of engagement of the second end 32 of the second arm component 20, to the object such as a wall frame 35, or post or beam, or member, or other object to be plumbed. As noted, the means for emitting a light beam, such as the laser component 30 is or may be weighted so as to always rotate in its rotational engagement and continuously position the projected light beam downward toward and to a communication and user-viewable point of intersection upon the support surface 31.

In use, with the planar surface 33 in contact with an object to be plumbed, such as depicted wall frame 35 in the as-used position of FIG. 1, the user standing on the support surface 31, by adjusting the device 10 using the handle portion 26, will cause a concurrent tilting of the object being made plumb and an adjustable positioning of the projected light beam, so as to allow for mating of an illumination point on the support surface 31 at upon a pre-positioned mark or line 40 at a measured distance H2, from the determined wall edge 41. This allows a single user to concurrently support, and tilt, and plumb the wall frame 35 or other object conventionally plumbed before final mounting.

With sufficiently strong materials forming the components, the device 10 also can provide the mechanical advantage to allow a single user to position and maintain the wall frame 35 substantially upright and align the projected light beam upon the pre-marked point 40 positioned at the distance H2 to ascertain a plumb positioning of the wall frame 35. Thus a user, without touching the wall frame 35, may concurrently hold the wall frame 35 vertically disposed, and determine the substantially correct perpendicular positioning of the wall frame 35, upon the support surface 31, in an exact vertical, without the aid of other workers or using any measuring device or level indicator such as the conventional bubble level in communication with the wall frame 35.

Also, in the preferred mode of the device 10, once the user is finished plumbing an object such as a wall frame 35, the device 10 may be left in operative contact with the object such as the wall frame 35 depicted, and locked in relative angles and positions in the aforementioned manner. The device 10 when locked and left in place in this fashion, provides a means for maintaining an object plumb with the contact surface 31, until a subsequent permanent engagement of the object can be performed using fasteners.

As noted, a locking of the device 10 may be accomplished by a fixing the sliding track 24, using finger tightened screw 25. So engaged and locked, the user can leave the plumb object and employ another device 10 to plumb another object, or, the user can move to nail or otherwise permanently fasten the plumb object such as the wall frame 35, held by the device 10, in position.

Figure 3:
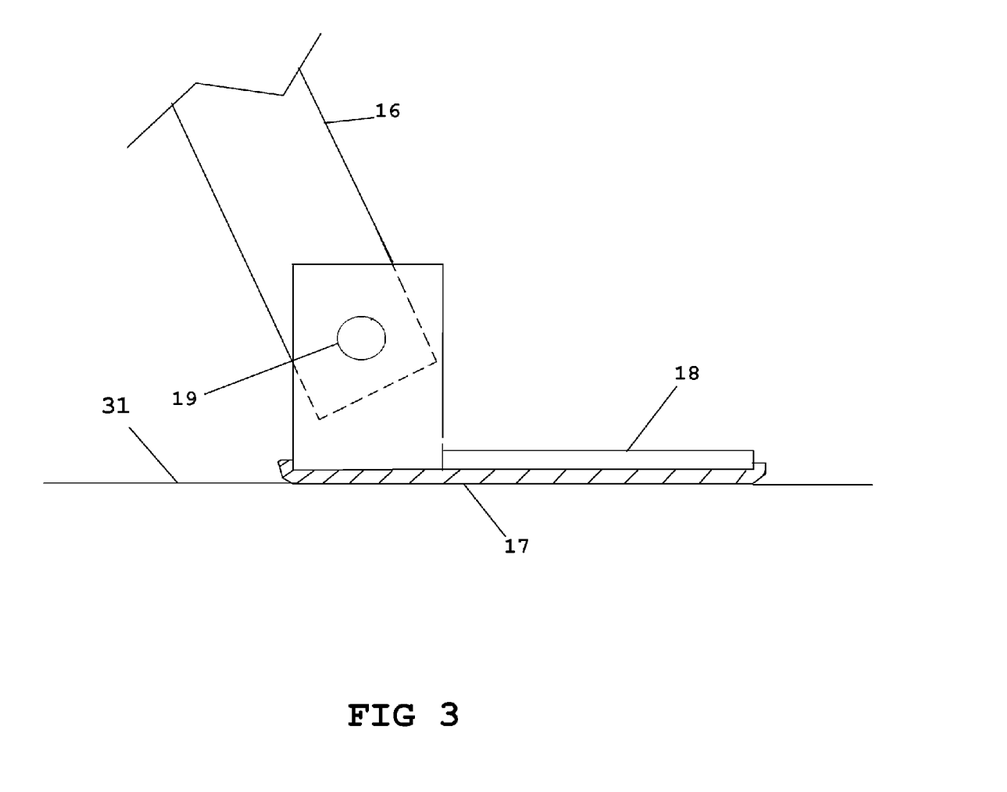
FIG. 3 is a view of the platform of the device.

FIG. 3 shows a view of a platform component 18 which provides means for removably fixed engagement of the distal end of the first arm 12, to the support surface 31. The platform component 18 is engaged to the distal end, using means for rotational engagement such as the pivotal hinge 19. So mounted, the platform component 18 provides a means for positioning one end of the device 10, at the distal end of the first arm component 12, in a removable fixed engagement with the support surface 31 during use and is easily disengaged when done.

The device 10 may be held engaged to the support surface 31 by a fastener such as a nail or screw, but it is preferably held in position with a removable engagement by frictional engagement of its first surface and the weight of the device 10 and/or the user's foot thereon upon a foot engagement upper surface of the platform component 18. The bottom surface of the platform component 18 may be augmented with gnarling, frictional enhancing surfacing, or sharp projections to form a non-slip surface, or an attached non-slip pliable substrate 17 such as rubber or plastic or the like, or an adhesive such as a reusable adhesive strip. The substrate 17 also provides a means to prevent any damage to the support surface 31 where the device is being used should it be a finished floor.

Before finally employing the device 10 for the concurrent final tilting to plumb an object such as the wall frame 35, the user and any helpers provided, erects the wall frame 35 in a substantially vertical orientation where it may be held by the device 10 with the sliding track 24 in a fixed engagement with both leg components. The device 10, correctly positioned, can provide the mechanical advantage for a single user to lift an object to be plumbed to a vertical position from a horizontal position.

Figure 4:
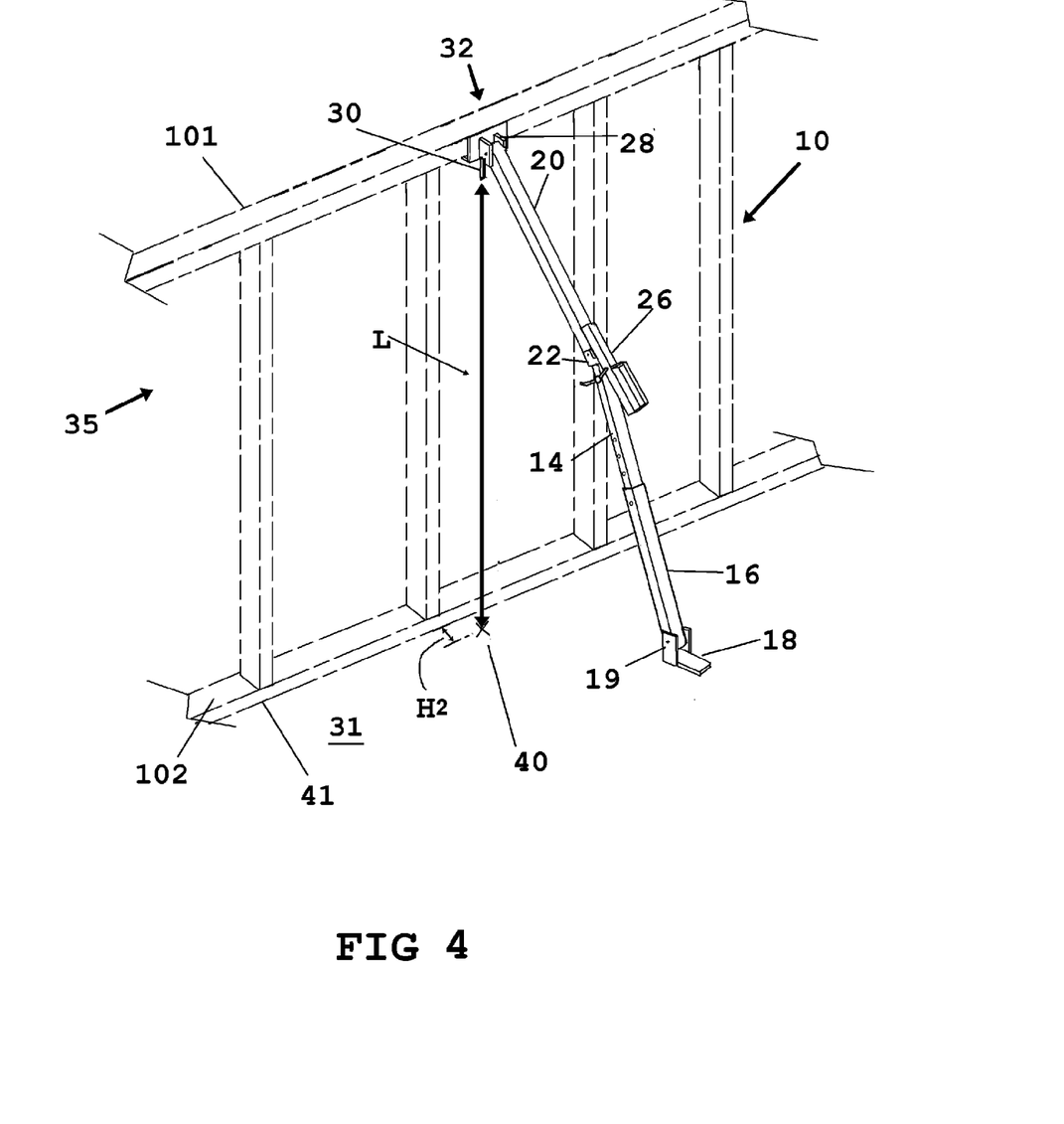
FIG. 4 is a perspective view of the device showing the indication marking on the ground used for determining exact vertical.

An alignment indication marking 40, on the support surface 31, depicted as an a line or the 'X' in FIG. 4, is drawn on the support surface 31 near a predetermined edge engagement mark 41 for the lower edge of the object such as wall frame 35, to be positioned and plumbed. Here such is shown as the bottom beam 102 of the wall frame 35 in its position relative to the support surface 31. This edge mark 41 for the object edge, is conventionally performed using building plans or the like which designate the positions of walls on the support surface 31 of a building.

The target line or marking 40 for emitted light "L" is placed at the distance H2 from the edge mark 41. It is this line or marking 40 where the illumination point on the support surface 31 from the emitted light beam from the light emitting component 30, will be adjusted to contact. This adjustment and alignment of the light beam "L" is performed by a tilting of the device 10 in the as-used position, which in turn will tilt the object being plumbed such as the wall frame 35 while concurrently moving the light component 30. Upon an alignment of the illuminated point of the light beam "L" to a contact with the line or marking 40 at the distance H2, there is provided a standing user, a visual means to ascertain a perpendicular or properly plumbed object such as wall frame 35, while standing on the support surface 31, a distance therefrom and using no ruler or measurement device such as a bubble level.

As noted, the indication line or marking 40 is determined and placed on the support surface 31 previously, by a marking of a distance H2 from a determined edge mark 41 for the bottom beam 102. The distance of H1 from the contact surface 33 is thus substantially equal to the distance H1 from the determined edge mark 41, and the light beam "L" will contact the marking 40, when the emitted light beam "L", and the object such as the wall 35, are both concurrently plumb and perpendicular to the support surface 31.

Figure 5:
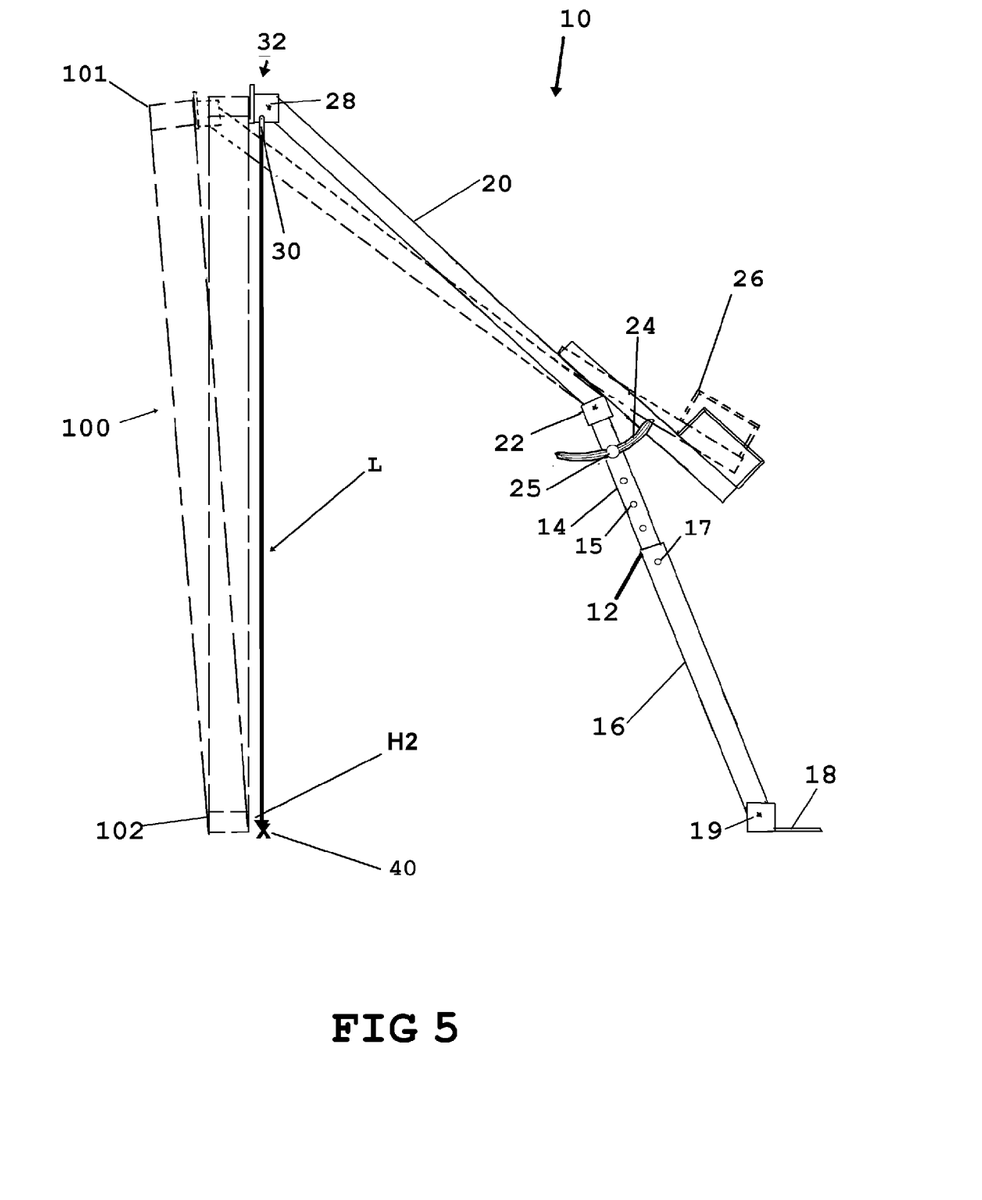
FIG. 5 shows a side view of the device in an as-used position allowing for concurrent support of the wall frame and moving thereof for adjustments to the tilt angle of the wall frame, by a single user.

Shown in FIG. 4, the emitted light beam "L" can be aligned to the indication marking 40 by a single user who easily makes adjustments to the tilt of the object such as wall frame 35 as shown in FIG. 5. As shown in FIG. 5, the object being made plumb, as shown as wall frame 35, extends between a top 101 and bottom 102 and can be positioned in exact vertical, or perpendicular to the support surface 31. The user then tightens the hand screw 25 or other means for locking the position of angle of the object such as wall frame 35, enabled by the device 10 in its bracing the wall frame 35. In this fashion, a single user, positioned on the support surface, may finally tilt and plumb framed walls, without the aid of other workers, by using the mechanical advantage of the device 10 and the ongoing projected light beam in a positioning upon the support surface which is viewable while moving the handle 26 to finally tilt the object such as the wall frame 35 to a proper attitude.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. An apparatus for positioning an object plumb relative to a support surface, comprising:

a first elongated member having a proximal end and a distal end;

a second elongated member having a first end and a second end;

means for rotational engagement of the proximal end of said first elongated member, at an engagement point with said second elongated member, said engagement point positioned between said first end and said second of said second elongated member;

a handle portion of said second elongated member, extending from said engagement point to said second end of said second elongated member;

means for removable positioning of said distal end of said first elongated member, at a mounting point on a support surface;

means for removable engagement of said first end of said second elongated arm, to a surface of a vertically disposed object being made plumb relative to said support surface;

means for projection of a light beam to an illumination point on said support surface, engaged at or adjacent to said first end of said second elongated member;

a tilting of said handle portion, with said distal end of said first elongated member at said mounting point, and said first end of said second elongated arm, in operative engagement with said surface of a vertically disposed object, causing movement of said illumination point upon said support surface;

means for a removable locked engagement of said handle portion of said second elongated member to a position adjacent to said proximal end of said first elongated member, said locked engagement maintaining relative angles of said first elongated member to said second elongated member, and providing a support to maintain said object plumb relative to said support surface; and alignment of said illumination point, with a target point positioned upon said support surface, through said tilting, providing a user visual means to ascertain said object is plumb relative to said support surface.

2. The apparatus for positioning an object plumb relative to a support surface of claim 1, additionally comprising:

said means for removable positioning of said distal end of said first elongated member, at a mounting point on a support surface being a mount rotationally engaged at an upper side to said distal end of said first elongated member;

said mount having a lower surface opposite said upper side, said lower surface having a frictionally enhanced surfacing thereon;

said means for removable engagement of said first end of said second elongated arm, to a surface of a vertically disposed object comprising a mount rotationally engaged to said first end of said second elongated arm on a first side; and said mount having a planar second side surface opposite said first size, said planar second side operatively engageable with said object.

3. The apparatus for positioning an object plumb relative to a support surface of claim 2, additionally comprising:

said means for projection of a light beam to an illumination point on said support surface, being an LED or laser in a rotational engagement at or adjacent to said first end of said second elongated member; and said rotational engagement providing means for gravity to maintain said light beam plumb, relative to said support surface during said tilting.

4. The apparatus for positioning an object plumb relative to a support surface of claim 1, additionally comprising:

said means for projection of a light beam to an illumination point on said support surface, being an LED or laser in a rotational engagement at or adjacent to said first end of said second elongated member; and said rotational engagement providing means for gravity to maintain said light beam plumb, relative to said support surface during said tilting.

5. The apparatus for positioning an object plumb relative to a support surface of claim 1, additionally comprising:

said first elongated member formed of a plurality sections telescopically engaged; and said first elongated member having a length which is adjustable.

6. An apparatus for positioning an object plumb relative to a support surface, comprising:

a first elongated member having a proximal end and a distal end;

a second elongated member having a first end and a second end;

means for rotational engagement of the proximal end of said first elongated member, at an engagement point with said second elongated member, said engagement point positioned between said first end and said second of said second elongated member;

a handle portion of said second elongated member, extending from said engagement point to said second end of said second elongated member;

a mount rotationally engaged to said first end of said second elongated arm on a first side;

said mount having a planar second side surface opposite said first size, said planar second side operatively engageable with said object;

a surface mount rotationally engaged at an upper side to said distal end of said first elongated member;

said surface mount having a lower surface opposite said upper side, said lower surface having a frictionally enhanced surfacing thereon adapted for removable positioning upon a support surface;

means for projection of a light beam to an illumination point on said support surface, engaged at or adjacent to said first end of said second elongated member;

a tilting of said handle portion, with said distal end of said first elongated member at said mounting point, and said first end of said second elongated arm, in operative engagement with said surface of a vertically disposed object, causing movement of said illumination point upon said support surface; and alignment of said illumination point, with a target point positioned upon said support surface, through said tilting, providing a user visual means to ascertain said object is plumb relative to said support surface.

7. The apparatus for positioning an object plumb relative to a support surface of claim 6, additionally comprising:

said means for projection of a light beam to an illumination point on said support surface, being an LED or laser in a rotational engagement at or adjacent to said first end of said second elongated member; and said rotational engagement providing means for gravity to maintain said light beam plumb, relative to said support surface during said tilting.

8. The apparatus for positioning an object plumb relative to a support surface of claim 6, additionally comprising:

said first elongated member formed of a plurality sections telescopically engaged; and said first elongated member having a length which is adjustable.

* * * * *